United States Patent
Melkote Krishnaprasad et al.

(10) Patent No.: US 11,716,212 B2
(45) Date of Patent: Aug. 1, 2023

(54) APPLICATION BASED DYNAMIC CONTROL OF MODEM DATAPATH BEHAVIOR

(71) Applicant: QUALCOMM Incorporated, San Diego, CA (US)

(72) Inventors: Vinay Melkote Krishnaprasad, Bangalore (IN); Prashanth Haridas Hande, San Diego, CA (US); Sandeep Kanakapura Lakshmikantha, Bangalore (IN); Peerapol Tinnakornsrisuphap, San Diego, CA (US); Deepak Khandelwal, San Diego, CA (US); Ravi Agarwal, San Diego, CA (US); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/120,714

(22) Filed: Dec. 14, 2020

(65) Prior Publication Data

US 2022/0191050 A1   Jun. 16, 2022

(51) Int. Cl.
*H04L 12/12* (2006.01)
*H04L 43/0894* (2022.01)
*H04L 47/125* (2022.01)

(52) U.S. Cl.
CPC .......... *H04L 12/12* (2013.01); *H04L 43/0894* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 5,946,347 A | * | 8/1999 | Hudson | H04L 1/004 375/222 |
| 8,489,153 B2 | * | 7/2013 | Quigley | H04N 21/6168 455/574 |
| 2014/0269755 A1 | | 9/2014 | Veiga | |
| 2015/0280871 A1 | * | 10/2015 | Xu | H04L 5/0035 370/336 |
| 2015/0373566 A1 | | 12/2015 | Pius et al. | |

(Continued)

FOREIGN PATENT DOCUMENTS

| | | |
|---|---|---|
| WO | 2014205288 A1 | 12/2014 |
| WO | 2018188481 A1 | 10/2018 |

(Continued)

OTHER PUBLICATIONS

International Search Report and Written Opinion—PCT/US2021/058341—ISA/EPO—dated Feb. 25, 2022; 16 pages.

*Primary Examiner* — Donald L Mills
(74) *Attorney, Agent, or Firm* — The Marbury Law Group, PLLC

(57) ABSTRACT

Methods and systems for providing software applications on a client device with dynamic control over low-latency mode (LLM) operations of the client device. The client device may monitor downlink data packets of a client software application operating on the client device to detect trigger events. The client device may determine operating parameters of the modem based on a detected trigger event and dynamically adjust the low-latency mode of the modem based on the detect trigger event or the determined operating parameters.

28 Claims, 8 Drawing Sheets

(56) References Cited

U.S. PATENT DOCUMENTS

| | | | |
|---|---|---|---|
| 2016/0066316 A1* | 3/2016 | Bhushan | H04W 72/0446 |
| | | | 370/329 |
| 2016/0173398 A1 | 6/2016 | Reinig | |
| 2016/0270018 A1* | 9/2016 | He | H04W 56/0025 |
| 2017/0064706 A1* | 3/2017 | Patel | H04L 1/1825 |
| 2017/0302597 A1* | 10/2017 | Veiga | H04L 49/9005 |
| 2019/0073327 A1* | 3/2019 | Mishra | G06F 13/28 |
| 2019/0158371 A1* | 5/2019 | Dillon | H04L 43/087 |
| 2019/0239097 A1 | 8/2019 | Meylan et al. | |
| 2019/0342225 A1* | 11/2019 | Sanghi | H04L 45/30 |
| 2020/0196182 A1 | 6/2020 | Nam et al. | |
| 2020/0314688 A1* | 10/2020 | Kattemane Satyaganapati | |
| | | | H04L 1/1812 |
| 2021/0288915 A1* | 9/2021 | Venkatesan | H04L 47/622 |
| 2021/0297350 A1* | 9/2021 | Vegesna | H04L 12/12 |
| 2021/0344620 A1* | 11/2021 | Veiga | H04L 47/2416 |

FOREIGN PATENT DOCUMENTS

| | | | | |
|---|---|---|---|---|
| WO | WO-2018188481 A1 * | 10/2018 | | H04W 52/02 |
| WO | 2019006582 A1 | 1/2019 | | |
| WO | WO-2019006582 A1 * | 1/2019 | | H04W 80/00 |
| WO | 2019206249 A1 | 10/2019 | | |

* cited by examiner

APPLICATION BASED DYNAMIC CONTROL OF MODEM DATAPATH BEHAVIOR

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements in communication technologies have facilitated the emergence of the Internet of Things (IOT), large scale Machine to Machine (M2M) communication systems, vehicles, and other technologies that rely on consistent and secure wireless communications. As a result, billions of small, mobile, or resource constrained computing devices (e.g., smartphones, watches, smart appliances, vehicles, etc.) now use Internet protocol (IP) and cellular communication networks to communicate critical and mundane information.

LTE, 5G NR, and other modern modems may support a low-latency mode (LLM). While operating in an LLM mode, data packets are moved to the next level without accumulation or aggregation. This reduces latency, but increases the amount of power and processing resources used by the device. Some modems support multiple LLM modes with different trade-offs latency, performance, and power and power consumption on the device.

SUMMARY

Various aspects include methods of dynamically adjusting a low-latency mode of a modem in a client device, which may include monitoring downlink data packets of a client software application operating on the client device to detect a trigger event, determining operating parameters of the modem based on a detected trigger event, and dynamically adjusting the low-latency mode of the modem based on the determined operating parameters.

In some aspects, determining the operating parameters of the modem based on the detected trigger event may include at least one of determining based on a detected trigger event whether to operate the client device at a higher power consumption level to increase the rate of delivering downlink data packets to the client software application, determining based on a detected trigger event whether to process downlink data packets in a hardware block of the modem without active involvement of a main application processor (AP) of the client device to reduce power consumption on the client device, or determining based on a detected trigger event whether to aggregate downlink data packets in the modem to reduce power consumption on the client device.

In some aspects, dynamically adjusting the low-latency mode of the modem based on the determined operating parameters may include invoking a packet flush at a fast time scale so that downlink data packets identified by the client software application are moved to a next level in a protocol or processing stack of the modem without performing accumulation or aggregation operations to reduce latency on the client device and performing the accumulation or aggregation operations on the remaining downlink data packets to reduce power consumption on the client device.

In some aspects, monitoring downlink data packets of the client software application operating on the client device to detect a trigger event may include evaluating timestamps of previously received data packets to determine whether previously received data packets arrived early or late, and dynamically adjusting the low-latency mode of the modem based on the determined operating parameters may include toggling between different low latency modes with different latencies based on whether the previously received data packets arrived early or late.

In some aspects, monitoring downlink data packets of the client software application operating on the client device to detect a trigger event may include monitoring downlink data packets to determine whether a condition of the client software application is static or near-static, determining the operating parameters of the modem based on a detected trigger event may include setting a timer in response to determining that the condition of the client software application is static or near-static, and dynamically adjusting the low-latency mode of the modem based on the determined operating parameters may include determining whether the timer has expired, aggregating or accumulating downlink data packets in the modem in response to determining that the timer has not expired, and invoking a packet flush that sends downlink data packets to a next level in a protocol or processing stack of the modem without performing accumulation or aggregation operations in response to determining that the timer has expired.

In some aspects, monitoring downlink data packets of the client software application operating on the client device to detect a trigger event comprises monitoring downlink data packets to detect a transport layer time out trigger event, detect whether all fragments corresponding to a slice arrived within a data burst, detect whether downlink data packets arrive earlier than expected, detect whether downlink data packets arrive later than expected, detect a download service outage event, or detect a controller event.

In some aspects, determining the operating parameters of the modem based on a detected trigger event comprises determining the operating parameters so as to balance tradeoffs between meeting immediate latency needs of the client software application and reducing power consumption on the client device.

Some aspects may include a computing device (e.g., a client device) having a memory storing processor-executable instructions and a processor configured to execute the processor-executable instructions configured to perform operations of any of the methods summarized above. Some aspects may include a processor for use in a computing device, the processor having memory and configured to perform operations of any of the methods summarized above. Some aspects may include a computing device having various means for performing functions of any of the methods summarized above.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

DETAILED DESCRIPTION

Figure 1:
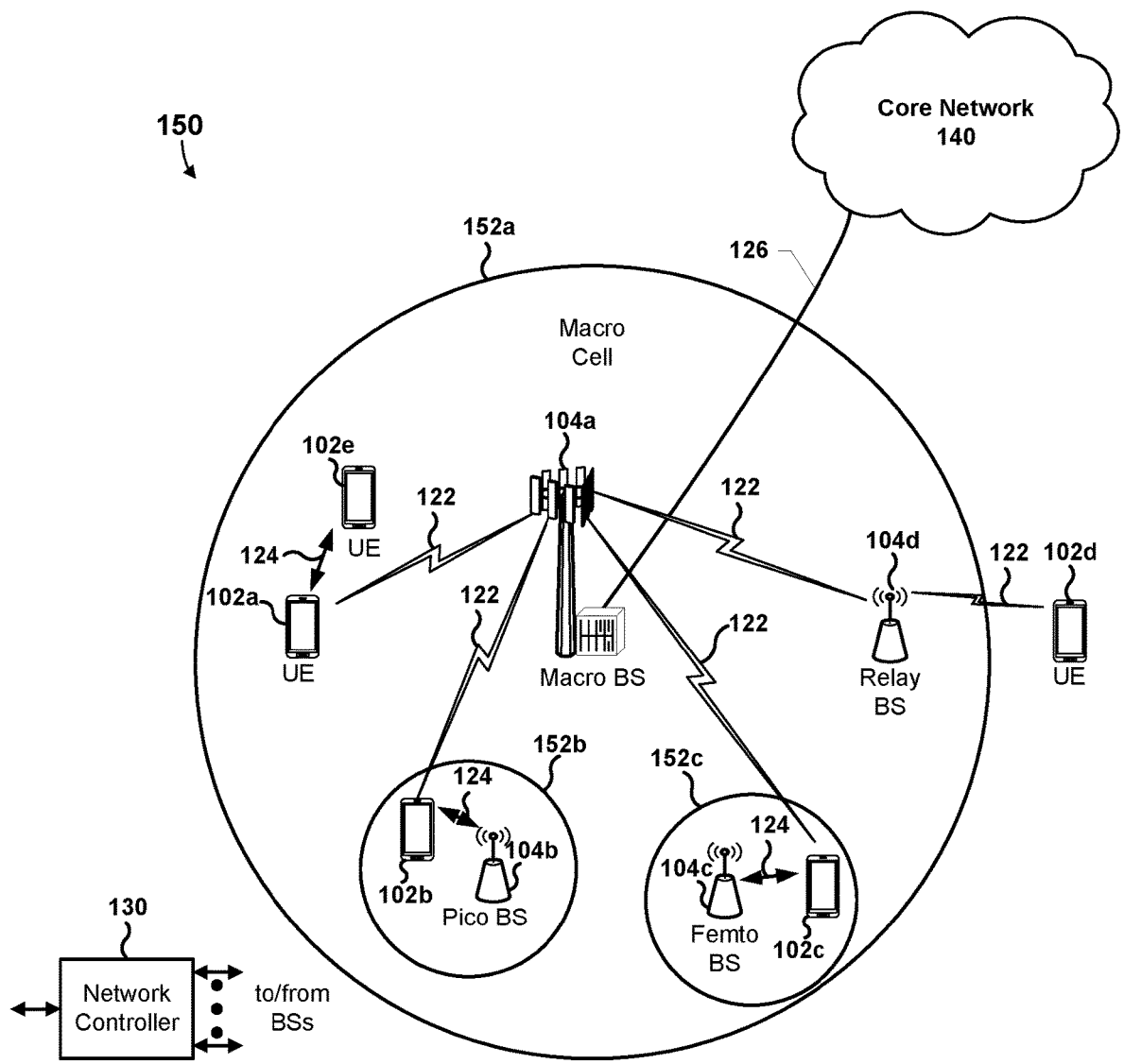
FIG. 1 is communication system block diagrams illustrating network components of example telecommunication systems suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, 'and components (e.g., 5G modems, client devices, etc.) configured to implement the methods, for providing client software applications with dynamic control over low-latency mode (LLM) operations of the modem/device. A modem in a client device may be configured to receive the data from a server or base station and determine whether the received data is for a low latency application. In response to determining that the received data is for a low latency application, the modem may dynamically enter a LLM in which the received data is passed from the modem to the client software application without aggregation or accumulation. In some embodiments, the modem may intelligently select an LLM so as to balance tradeoffs between improved performance, power consumption, latency, and/or thermal dissipation characteristics of the device.

A number of different cellular and mobile communication services and standards are available or contemplated in the future, all of which may implement and benefit from various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), and digital enhanced cordless telecommunications (DECT). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "client device" may be used herein to refer to any one or all of wireless devices, internet-of-things (TOT) devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, connected vehicles, and similar electronic devices which include a programmable processor, a memory and circuitry for sending and/or receiving wireless communication signals. While various embodiments are particularly useful in wireless devices, such as smartphones and tablets, the embodiments are generally useful in any electronic device that includes communication circuitry for accessing wireless Internet Protocol (IP) and data services through cellular and wireless communication networks.

The term "IP Accelerator (IPA)" is used herein to a hardware block within a modem of a client device. The IPA may be configured to execute datapath functions and/or to allow the client device to perform certain network functions (e.g., routing, filtering, network address translation, aggregation, etc.) without the active involvement of the client device's main application processor (AP). A datapath may be a path between an application layer component (e.g., client software application, etc.) and the modem. Datapath functions may be performed on the uplink and downlink bits within the application layer and/or the modem's packet data convergence protocol (PDCP) layer.

The term "system on chip (SOC)" is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package (SIP)" may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Generally, a client device receives data from a server at a regular cadence. The modem of the client device holds the data it receives (i.e., for accumulation, heuristics, aggregation, etc.) for a small amount of time before sending the data to a client software application. While this delay is tolerable for most client software applications, it could be problematic for software applications whose performance could be impacted by delayed data receipts (latency), such as extended reality (XR) and Cloud gaining software applications.

A modem may include multiple operating modes, including, one or more low-latency modes (LLM) in which packets are moved to the next level in the protocol or processing stack without preforming accumulation or aggregation operations. A modem may also include features that allow client software applications operating on the device and/or receiving the data packets to select and set the low-latency mode for the device or application. While such low-latency modes reduce latency, they may require/consume additional processing resources and/or increase power consumption on the device. For example, a low latency operating mode may require that modem operate at a higher frequency to process tasks faster (e.g., as measured in millions of instructions per second (MIPS), etc.), which may drain a mobile device's battery or increase the power consumption characteristics of the client device. To better balance tradeoffs between latency, performance and power consumption, some modems allow the client software applications to select one of multiple different low-latency modes, each of which strikes a different balance and/or implements a different trade-off point between latency, performance and power consumption.

Using conventional solutions, a client device or modem that enters a low-latency mode will continue to operate in that mode regardless of whether packets are delayed, regardless of whether the modem continues to strike a suitable balance between latency, performance and power consumption, and/or regardless whether the low-latency mode operations continue to be effective or beneficial. This may cause an unnecessary power drain in the client device. For example, the impact on the user experience of data packet latency may vary significantly throughout game play (e.g., explosions require low-latency, while near static scenes do not). As such, a gaming application that selects a particular a low latency mode may strike correct balance between latency and power consumption for some tasks (e.g., explosions in gameplay, etc.), waste the device's processing or battery resources for other tasks (e.g., rendering near static scenes, etc.).

Various embodiments overcome the limitations of conventional solutions by configuring the modem (e.g., a 5G modem) to enable application-based dynamic configuration of its IPA and datapath parameters to dynamically implement or adjust the low-latency mode based on a variety of application conditions. As such, a modem configured in accordance with the embodiments may deliver packets with low latency for some task or in some portions of the execution of the application (e.g., when gameplay is fast or an action requires a large data download, etc.) and deliver packets power-efficiently for other tasks or in other portions of the execution of the application (e.g., in static or slower moving portions of the gameplay, etc.).

The modem may be configured to allow a client software application (i.e., the app using the data) to use application layer or transport layer triggers (e.g., real-time transport protocol layer trigger events, etc.) to determine whether to enter into a low latency mode and/or to determine operating parameters that balance tradeoffs between latency, performance and power consumption on the device. For example, the client software application may use trigger events to determine whether downlink data packets should be delivered faster at a higher power consumption, whether downlink data packets may be subjected to the IPA and datapath aggregation/accumulation on the modem to reduce power consumption on the client device, and/or whether a static condition exist that allows the data packets to be aggregated for an even greater reduction in power consumption on the client device.

In response to the client software application determining that downlink data packets should be delivered faster at a higher power consumption, the client software application may invoke a packet "flush" frequently or using a fast time scale (e.g. every 1-100 milliseconds, etc.). Only the packets that are indicated by the client software application are moved to the next level in the protocol or processing stack without performing accumulation or aggregation operations. All other packets are accumulated or aggregated so as to reduce power consumption on the device.

In response to the client software application determining that downlink data packets may be subjected to the IPA and datapath aggregation/accumulation on the modem, or in response to determining that the packets may be delivered less frequently or on a slower time scale (e.g. every 100 ms, 1 second, 3 seconds, etc.), the client software application may toggle between different low latency modes with different latencies based on how late or early past packets have been received.

In response to the client software application determining that a static condition exist that allows the data packets to be aggregated or that the current conditions are nearly static (e.g., a pause in the action or near still imagery for several seconds or minutes, etc.), the client software application may configure a frame or slice timeout associated with an event (e.g., first packet rx, last packet rx) at the modem. In response, the modem may aggregate packets of the frame (or slice). The modem may start a timer in response to determining that the event occurred. Upon detecting a timeout or expiration of the timer, the client software application may invoke a packet "flush" so that the packets are flushed to the application layer and/or so that the packets are accumulated/aggregated so as to improve the power consumption characteristics of the client device.

In some embodiments, the client software application may be configured to dynamically determine operating parameters, dynamically select a low-latency mode, and/or dynamically control low-latency mode operations so as to balance tradeoffs between meeting immediate latency needs of the client software application and reducing power consumption on the client device.

In various embodiments, the client software application may be configured to use detected application layer or transport layer trigger events to determine operating parameters (i.e., values that strike the correct balance between latency, performance and power consumption on the device). A trigger may be an event driven procedure, message or information structure that includes a trigger definition. A trigger definition may identify or define one or more trigger events. The term "trigger events" is used herein to refer to events or conditions defined in a trigger definition to cause the client device to perform low latency mode (LLM) related actions. In particular, in response to detecting a trigger event, the client device may determine operating parameters of the modem based on a detected trigger event, and then dynamically adjust the low-latency mode of the modem based on the determined operating parameters. None-limiting examples of trigger events include a transport layer time out, detecting that not all fragments corresponding to a slice arrived within a data burst, determining that packets arrived earlier or later than expected, detecting a short/outage in a download service, detecting that not all fragments corresponding to a slice have been received or not included within a received data burst, detecting a short/outage in the download service, detecting controller event such as a button press event, and the like. The trigger definition may also include a payload or contents of the trigger event (e.g., a software application procedure, etc.), information that identifies a destination to which the payload/content is to be sent, and/or trigger type information.

In some embodiments, the client software application may be configured to dynamically select a low-latency mode and/or dynamically control low-latency mode operations based on trigger events/conditions, which may include the client device detecting trigger events such as a transport layer time out, determining that not all fragments corresponding to a slice arrived within a data burst, determining that packets arrived earlier or later than expected, detecting a short/outage in a download service, and/or based on the nature of controller events or their mappings.

In some embodiment, the trigger event/condition may be based on a transport layer time out. The client software application may use a transport layer sub-module or sub-layer, such as a Reliable-User Datagram Protocol (RUDP) transport layer, to comply with strict reliability and latency constraints. The RUDP layer component generally requests retransmission of lost packets. On a pre-programmed timeout, the RUDP layer component may acknowledge any or all packets (e.g., up to a certain sequence number, etc.) that have not yet arrived at the socket. Prior to such a timeout, the RUDP layer component may determine or select a low latency mode that immediately releases packets that have accumulated in the IPA. That is, packets that have accumulated in the IPA are not marked lost (from the socket's point of view), which may improve the latency characteristics of the client device and/or client software application.

In some embodiment, the trigger event may be based on a determination in the real-time transport protocol (RTP) layer that not all fragments corresponding to a slice have arrived within a data burst. That is, RTP layer components may be configured to inspect packet headers and determine whether all fragments corresponding to a slice were included within a received data burst. In response to the trigger event of determining that all fragments corresponding to a slice have not yet arrived or where not include within a received data burst, the client device may determine or select a low latency mode that immediately releases the stragglers (i.e., the slice fragments that have not yet arrived) so that the client device may commence performing data decoding operations. This may improve the latency characteristics of the client device and/or client software application.

In some embodiment, the trigger event/condition may be based on whether packets are early or late. For example, the client device may compare RTP timestamps of the packets to determine whether packets are early or late, and dynamically implement or adjust the low-latency mode based on whether packets are received early or late. In some embodiments, the client device may be configured to read the RTP timestamp of each packet as an absolute value. If the local clock offset with respect to source clock is known, the client device may determine whether the packet is early based on the absolute RTP timestamp of that packet. The client device may implement or adjust the low-latency mode based on whether packets are received early and/or to improve the latency characteristics of the client device and/or client software application.

In some embodiment, the trigger event/condition may be based on whether there has been a short/outage in the download service. A short/outage in the download service may indicate to the client device that a burst of accumulated packets may soon arrive. As such, in response to detecting a short/outage in the download service, the client device or client software application may trigger the low-latency mode to move to the next I-frame in the sequence to stem error-propagation. The client device may continue to trigger (or continue to operate in) the low latency mode until the I-frame is received.

In some embodiment, the trigger event/condition may be based on the nature of controller events and/or their mappings. The client device or client software application may trigger the low-latency mode in response to the client software application detecting button presses (which are controller events) so that an action associated with the button press event (e.g., simulated gun shots in a gaming app, etc.) may can be received, processed, presented or rendered with low latency.

FIG. 1 illustrates an example of a communications system 150 that is suitable for implementing various implementations. The communications system 150 may be a 5G NR network, or any other suitable network such as an LTE network.

The communications system 150 may include a heterogeneous network architecture that includes a communication network 140 and a variety of client devices (illustrated as client device 102a-102e in FIG. 1). The communications system 150 also may include a number of base stations (illustrated as the BS 104a, the BS 104b, the BS 104c, and the BS 104d) and other network entities. A base station is an entity that communicates with client devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. For ease of reference, the term "base station" is used herein to refer to any of a range of communication nodes in wireless communication networks including for example an eNB, NR BS, gNB, TRP, AP, node B, 5G NB, Customer Premises Equipment (CPE), an integrated access backhaul (IAB) node and other communication nodes that establish a wireless communication "cell."

A base station 104a-104d may provide communication coverage for a macro cell, a pico cell, a femto cell, another type of cell, or a combination thereof. A macro cell may cover a relatively large geographic area (for example, several kilometers in radius) and may allow unrestricted access by client devices with service subscription. A pico cell may cover a relatively small geographic area and may allow unrestricted access by client devices with service subscription. A femto cell may cover a relatively small geographic area (for example, a home) and may allow restricted access by client devices having association with the femto cell (for example, client devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 104a may be a macro BS for a macro cell 152a, a base station 104b may be a pico BS for a pico cell 152b, and a base station 104c may be a femto BS for a femto cell 152c. A base station 104a-104d may support one or multiple (for example, three) cells.

In some examples, a cell may not be stationary, and the geographic area of the cell may move according to the location of a mobile base station. In some examples, the base stations 104a-104d may be interconnected to one another as well as to one or more other base stations or network nodes (not illustrated) in the communications system 150 through various types of backhaul interfaces, such as a direct physical connection, a virtual network, or a combination thereof using any suitable transport network.

The communications system 150 also may include relay stations (such as relay BS 104d). A relay station is an entity that can receive a transmission of data from an upstream station (for example, a base station or a client device) and send a transmission of the data to a downstream station (for example, a client device or a base station). A relay station also may be a client device that can relay transmissions for other client devices. In the example illustrated in FIG. 1, a relay station 104d may communicate with the macro base station 104a and the client device 102d in order to facilitate communication between the macro base station 104a and the client device 102d. A relay station also may be referred to as a relay base station, a relay, etc.

The communications system 150 may be a heterogeneous network that includes base stations of different types, for example, macro base stations, pico base stations, femto base stations, relay base stations, etc. These different types of base stations may have different transmit power levels, different coverage areas, and different impacts on interference in communications system 150. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The client devices 102a, 102b, 102c may be dispersed throughout communications system 150, and each client device may be stationary or mobile. A client device also may be referred to as an access terminal, a terminal, a mobile station, a subscriber unit, a station, etc. A client device 102a, 102b, 102c may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

A macro base station 104a may communicate with the communication network 140 over a wired or wireless communication link 126. The client devices 102a, 102b, 102c may communicate with a base station 104a-104d over wireless communication links 122.

Wired communication links 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links 122, 124 may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 150 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per client device. Multi-layer transmissions with up to two streams per client device may be supported. Aggregation of multiple cells may be supported with up to eight serving cells. Alternatively, NR may support a different air interface, other than an OFDM-based air interface.

Some client devices may be considered machine-type communication (MTC) or evolved or enhanced machine-type communication (eMTC) client devices. MTC and eMTC client devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some client devices may be considered Internet-of-Things (IoT) devices or may be implemented as NB-IoT (narrowband internet of things) devices. The client device 102a-102e may be included inside a housing that houses components of the client device 102a-102e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

In some implementations, two or more client devices 102a-102e (for example, illustrated as the client device 102a and the client device 102e) may communicate directly using one or more sidelink channels 124 (for example, without using a base station 104a-d as an intermediary to communicate with one another). For example, the client devices 102a-102e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the client device 102a-102e may perform scheduling operations, resource selection operations, as well as other operations described elsewhere herein as being performed by the base station 104a-d.

To establish communication with a base station 104a-d, a client device 102a-102e may attempt to acquire SI from the base station 104a-d. SI may be provided in one or more system information blocks, such a Master Information Block (MIB) and one or more System Information Blocks (SIBs). SI provides timing and structure information that enables the client device 102a-102e to receive and decode further information from the base station 104a-d that enables the client device 102a-102e for example, to access communications through the base station 104a-d, cell access, to perform cell reselection, intra-frequency, inter-frequency and inter-RAT cell selection procedures, and other operations.

In 5G NR, certain system information, such as the MIB and a SIB1 message, are broadcast by a base station. In some implementations, additional SI may be broadcast as well. However, in some implementations, the additional SI (such as on-demand SI) may be transmitted by the base station in response to a request for the additional SI (such as a request for the on-demand SI). In some implementations, the broadcast SI (that is, the MIB or SIB1 messages) may include scheduling information to enable the client device 102a-102e to request and receive the on-demand system information.

When a client device 102a-102e is powered on, the client device 102a-102e may perform a cell search and acquire one or more synchronization signals (such as a Primary Synchronization Signal (PSS) and a Secondary Synchronization Signal (SSS)) and a Physical Broadcast Channel (PBCH) from a base station 104a-d. Using the synchronization signal(s) and information from the PBCH the client device 102a-102e may receive, decode and store MIB message(s) from the base station 104a-d. Using parameters from the decoded MIB, the client device 102a-102e may receive and decode the SIB1 message. In some implementations, the SIB1 message may indicate that the base station 104a-d is configured to provide one or more on-demand SI messages. To acquire the on-demand SI messages, the client device 102a-102e may send a request to the base station 104a-d for the one or more on-demand SI messages. In some implementations, sending the request for the one or more on-demand messages may be part of a Random Access Channel (RACH) request procedure.

Figure 2:
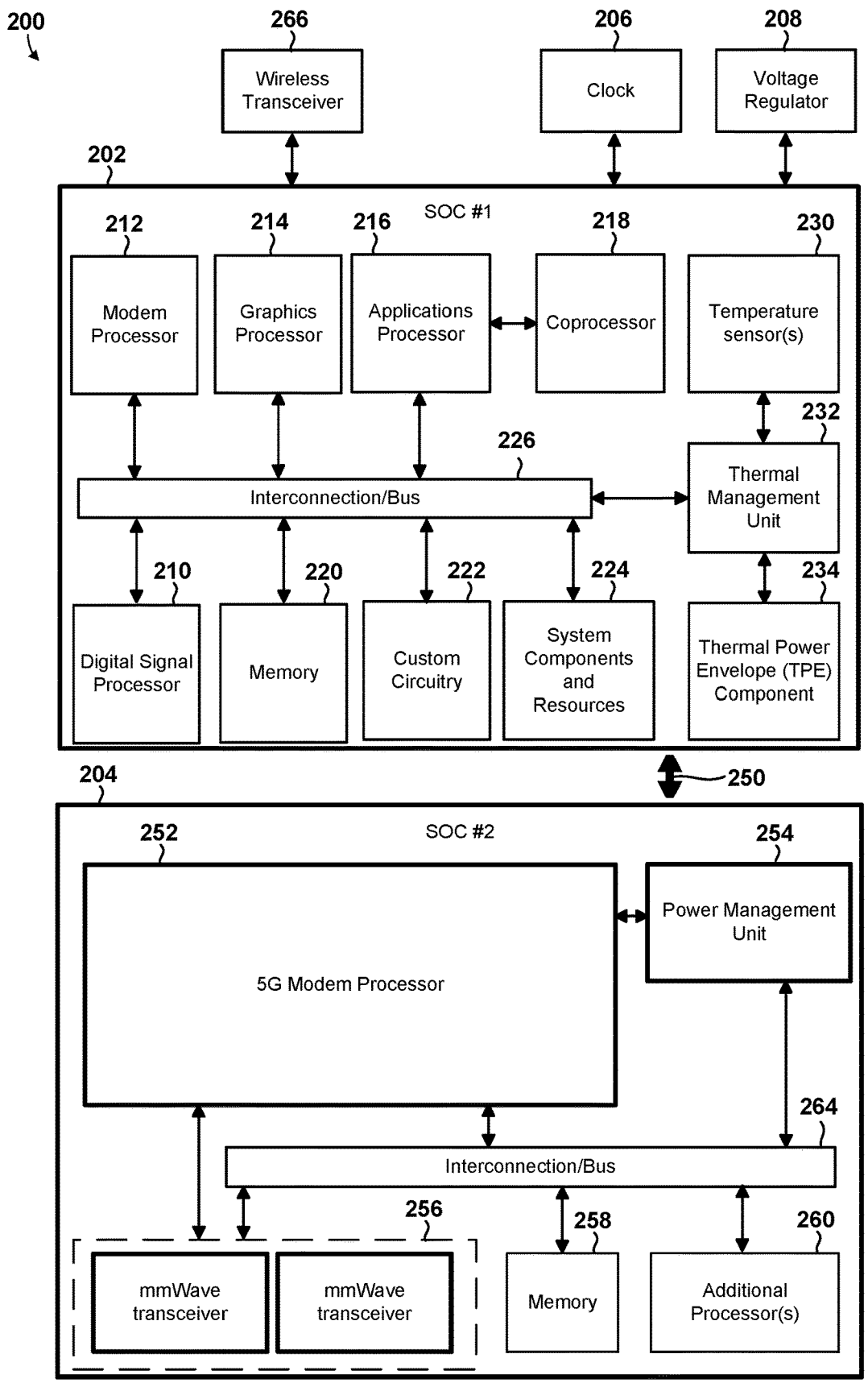
FIG. 2 is a component block diagram of an example computing system that could be configured to detect and respond to unauthorized emergency messages and unauthorized presidential alerts in accordance with the embodiments.

FIG. 2 illustrates an example computing system or SIP 200 architecture that may be used in client devices implementing the various implementations.

With reference to FIGS. 1 and 2, the illustrated example SIP 200 includes a two SOCs 202, 204, a clock 206, a voltage regulator 208, and a wireless transceiver 266 configured to send and receive wireless communications via an antenna (not shown) to/from client devices, such as a base station 104a. In some implementations, the first SOC 202 operates as central processing unit (CPU) of the client device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a client device. The system components and resources 224 or custom circuitry 222 also may include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
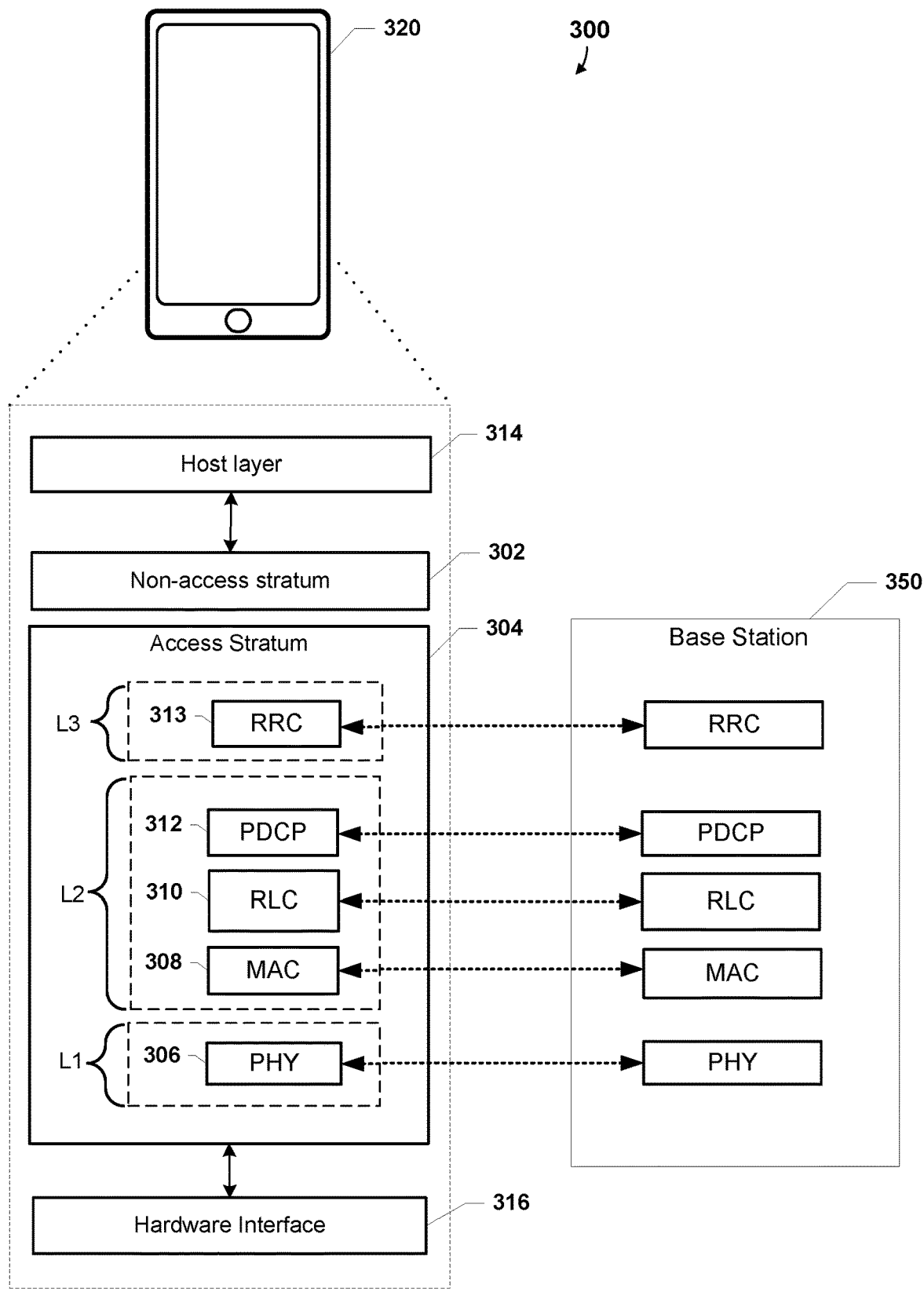
FIG. 3 is a component block diagram of an example software architecture including a radio protocol stack for the user and control planes in wireless communications.

FIG. 3 illustrates an example of a software architecture 300 including a radio protocol stack for the user and control planes in wireless communications between a base station 350 (such as the base station 104a) and a client device 320 (such as the client devices 102a-102e, 200). With reference to FIGS. 1A-3, the client device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) client device, the software architecture 300 may include multiple protocol stacks, each of which may be associated with a different subscriber identity module (SIM) (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the client device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the client device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions including broadcasting system information, paging, and establishing and releasing an RRC signaling connection between the client device 320 and the base station 350.

In various implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the client device 320. In some implementations, application-specific functions provided by the at least one host layer 314 may provide an interface between the software architecture and the general purpose processor 206.

In other implementations, the software architecture 300 may include one or more higher logical layers (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency transceivers).

In some embodiments, the protocol stack of the client device may include a physical layer module, a data link layer module, a network layer module, a transport layer module, and an application layer module, each of which may be implemented in hardware, in software, or in a combination of hardware and software. Further, each of these may include sub-layers, which may also be implemented in hardware, in software, or in a combination of hardware and software.

The physical layer module may include radio components configured to receive the basic communication signal, extract data from the communication signal, and provide the data to a media transport stream (e.g., MPEG-2 Transport Stream) or a media access control module in the data link layer module. The data link layer module may provide addressing and channel access control mechanisms that make it possible for various components of the client device to receive the different streams of data. The data link layer module may also include various sub-modules or sub-layers for carrying a packet protocol (e.g., Internet Protocol) on top of a Moving Picture Experts Group (MPEG) transport stream (TS), such as a multiprotocol encapsulation forward error correction (MPE-FEC) module/layer and a program and system information (SI/PSI) module/layer.

Portions of the stream/signal carrying the content and information flows may be passed by the data link layer module to the network layer module, which may include an IP module/interface for communicating/relaying streams, datagrams and/or packets to the transport layer module. Streams and data received in the transport layer module may be delivered to the appropriate transport layer sub-modules or sub-layers, which process and package the data for transport. Such transport layer sub-modules/sub-layers may include a user datagram protocol (UDP) module/layer, an asynchronous layered coding/layered coding transport (ALC/LCT) module/layer, a real-time transport protocol (RTP) module/layer, and a file delivery over unidirectional transport (FLUTE) module/layer. In an embodiment, the RTP module/layer may be included in or as part of the application layer, similar to Dynamic Adaptive Streaming over Hyper Text Transport Protocol (HTTP) (DASH) formats.

The application layer module may include protocols and methods required to establish host-to-host, end-to-end connections and to conduct process-to-process communications. The application layer module may also include end-user applications (e.g., media player, etc.) for processing, rendering and/or displaying the received content on the mobile receiver device. The application layer may also include media formats, such as DASH formats, encoded media streams and other media related metadata, an RTP module, and a media player module.

Figure 4A:
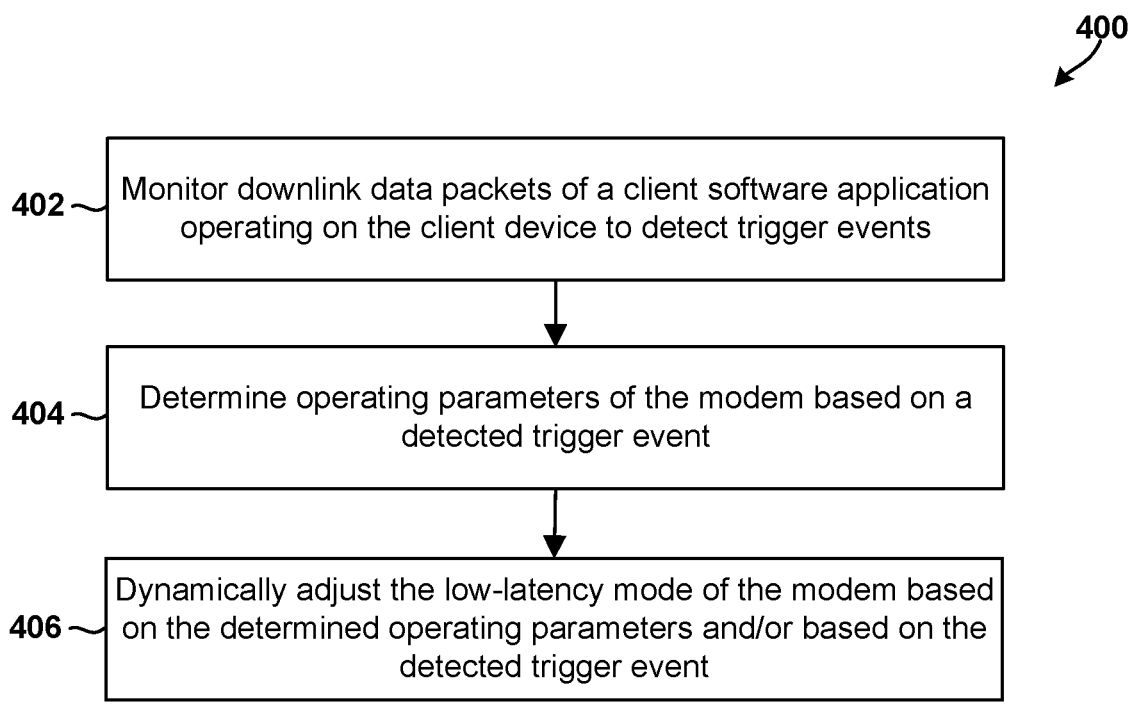
FIG. 4A-4D are process flow diagrams illustrating methods of operating a base station to eliminate or reduce beam splitting in accordance with some embodiments.
Figure 4B:
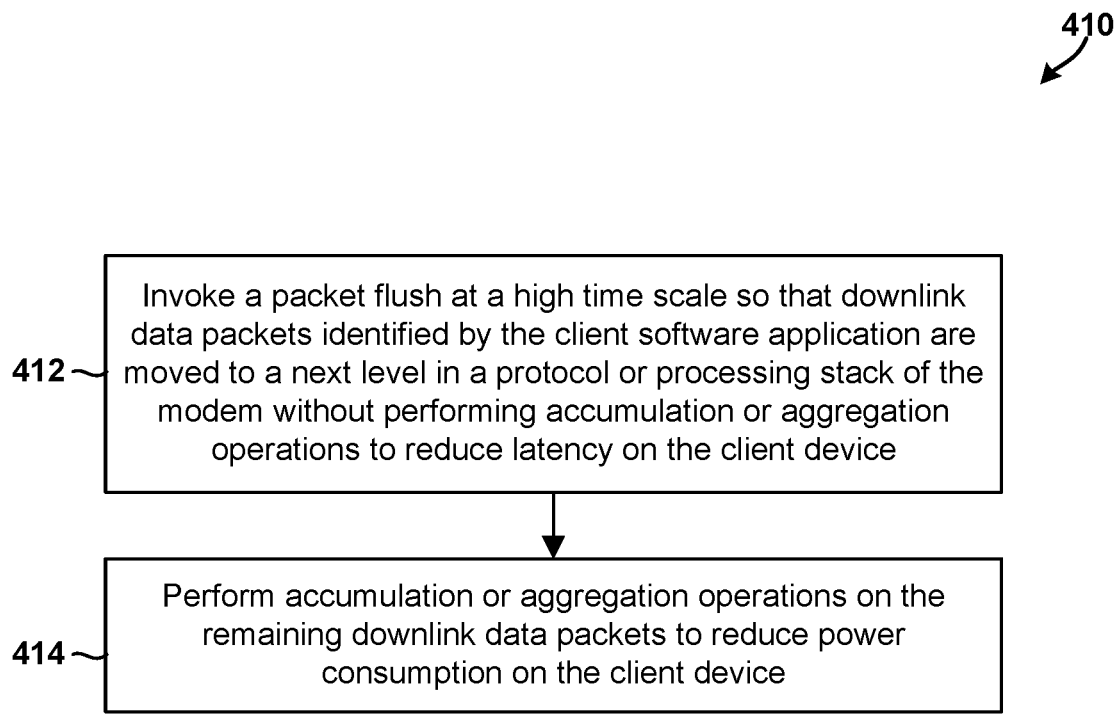
Figure 4C:
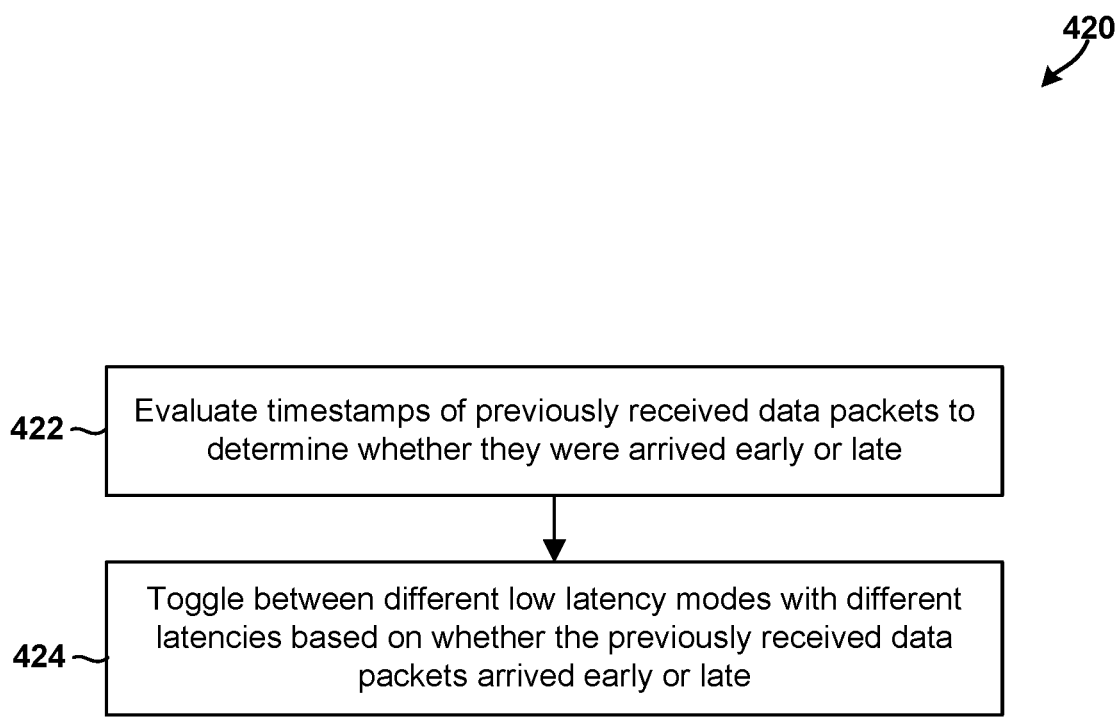
Figure 4D:
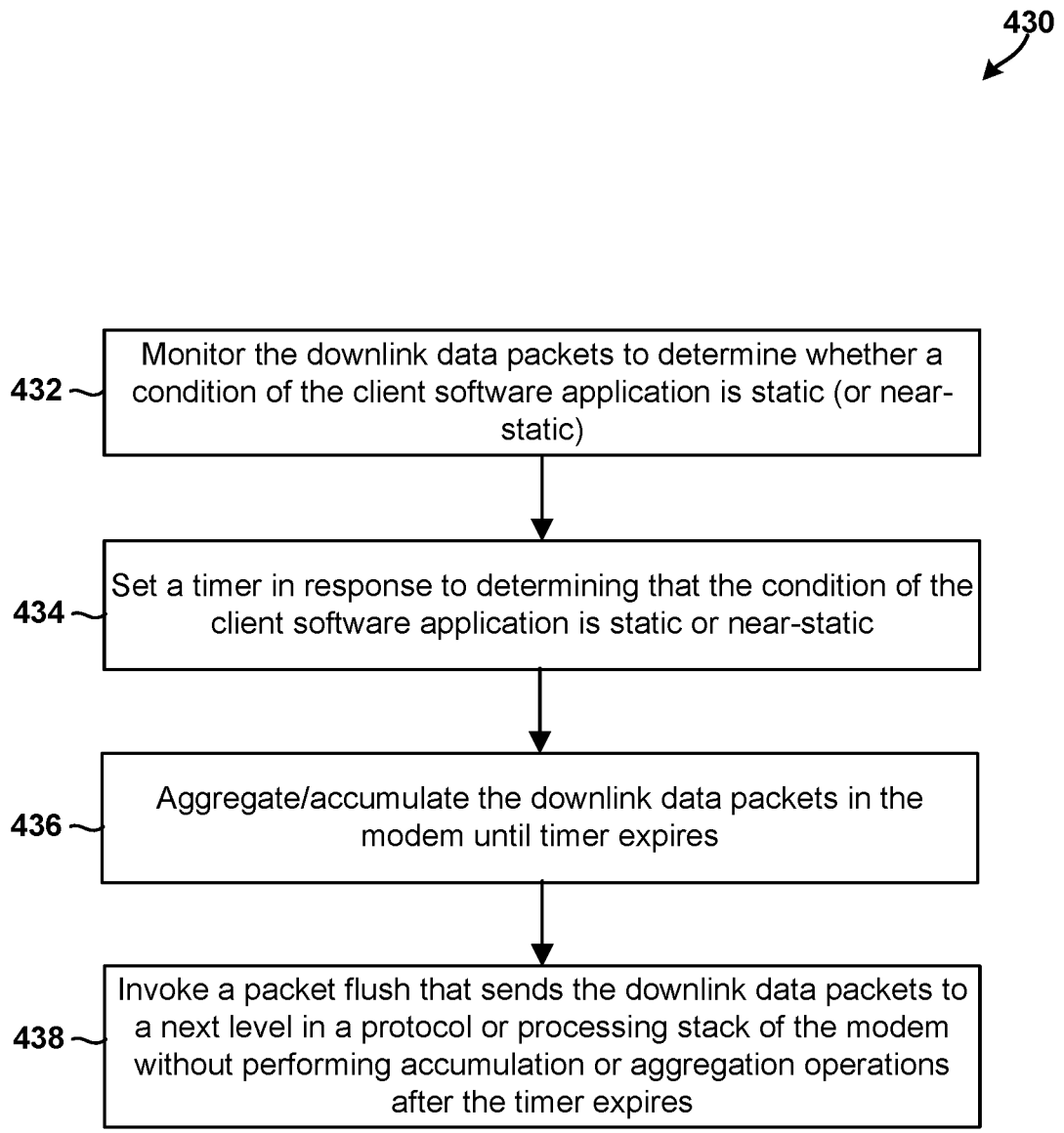

FIG. 4A illustrates a method 400 that may be executed by a processor of client device to dynamically implement or adjust the low-latency mode in accordance with some embodiments. FIGS. 4B, 4C, and 4D illustrate alternative operations in methods 410, 420, and 430 that may be performed as part of the method 400 in some embodiments. The operations of the methods 400, 410, 420, and 430 are intended to be illustrative. In some embodiments, methods 400, 410, 420, and 430 may be accomplished with one or more additional operations not described, and/or without one or more of the operations discussed.

With reference to FIGS. 1-4G, the methods 400, 410, 420, and 430 may be implemented in one or more processors (e.g., 202, 204, 210, 212, 214, 216, 218, 252, 260) of a client device configured with processor-executable instructions stored on a non-transitory processor-readable storage medium. The processing system may include one or more processor (e.g., 202, 204, 210, 212, 214, 216, 218, 252, 260) configured through hardware, firmware, and/or software stored in memory (e.g., 220, 258, 325).

FIG. 4A illustrates a method 400 of dynamically adjusting the low-latency mode in accordance with some embodiments. In block 402, a client device processor may monitor downlink data packets of a client software application operating on the client device to detect trigger events. Trigger events may include the client device detecting a transport layer time out, the client device determining that not all fragments corresponding to a slice arrived within a data burst, the client device determining that packets arrived earlier or later than expected, the client device detecting a short/outage in a download service, and/or based on the presence, the client device detection or nature of controller events or their mappings.

In block 404, the client device processor may determine operating parameters of the modem based on a detected trigger event. In some embodiments, the processor may determine operating parameters that balance tradeoffs between latency, performance and power consumption on the device. In some embodiments, the client software application may use the triggers to determine whether downlink data packets should be delivered faster at a higher power consumption, whether downlink data packets may be subjected to the IPA and datapath aggregation/accumulation on the modem to reduce power consumption on the client device, and/or whether a static condition exist that allows the data packets to be aggregated for an even greater reduction in power consumption on the client device.

In block 406, the client device processor may dynamically adjust the low-latency mode of the modem based on the determined operating parameters and/or based on the detected trigger event. In some embodiments, the client device processor may invoke a packet flush at a fast time scale so that downlink data packets identified by the client software application are moved to a next level in a protocol or processing stack of the modem without performing accumulation or aggregation operations to reduce latency on the client device, and perform the accumulation or aggregation operations on the remaining downlink data packets to reduce power consumption on the client device. In some embodiments, the client device processor may toggle between different low latency modes with different latencies based on the operation conditions of the device (or the current tasks performed by the client software application) so as to balance tradeoffs between latency, performance and power consumption on the device.

FIG. 4B illustrates a method 410 of dynamically adjusting the low-latency mode in accordance with an embodiment. In some embodiments, the method 410 may be performed as part of the operations in block 406 of the method 400.

In block 412, the client device processor may invoke a packet flush at a fast time scale so that downlink data packets identified by the client software application are moved to a next level in a protocol or processing stack of the modem without performing accumulation or aggregation operations to reduce latency on the client device.

In block 414, the client device processor may perform accumulation and/or aggregation operations on the remaining downlink data packets to reduce power consumption on the client device.

FIG. 4C illustrates a method 420 of dynamically adjusting the low-latency mode in accordance with an embodiment. In block 422, the client device processor may evaluate timestamps of previously received data packets to determine whether the previously received data packets arrived early or late. In block 424, the client device processor may toggle between different low latency modes with different latencies based on whether the previously received data packets arrived early or late, FIG. 4D illustrates a method 430 of dynamically adjusting the low-latency mode in accordance with an embodiment. In block 432, the client device processor may monitor downlink data packets to determine whether a condition of the client software application is static (or near-static). In block 434, the client device processor may set a timer in response to determining that the condition of the client software application is static or near-static. In block 436, the client device processor may commence aggregating and/or accumulating downlink data packets in the modem until the timer expires. In block 438, the client device processor may invoke a packet flush that sends downlink data packets to a next level in a protocol or processing stack of the modem without performing accumulation or aggregation operations after the timer expires.

Figure 5:
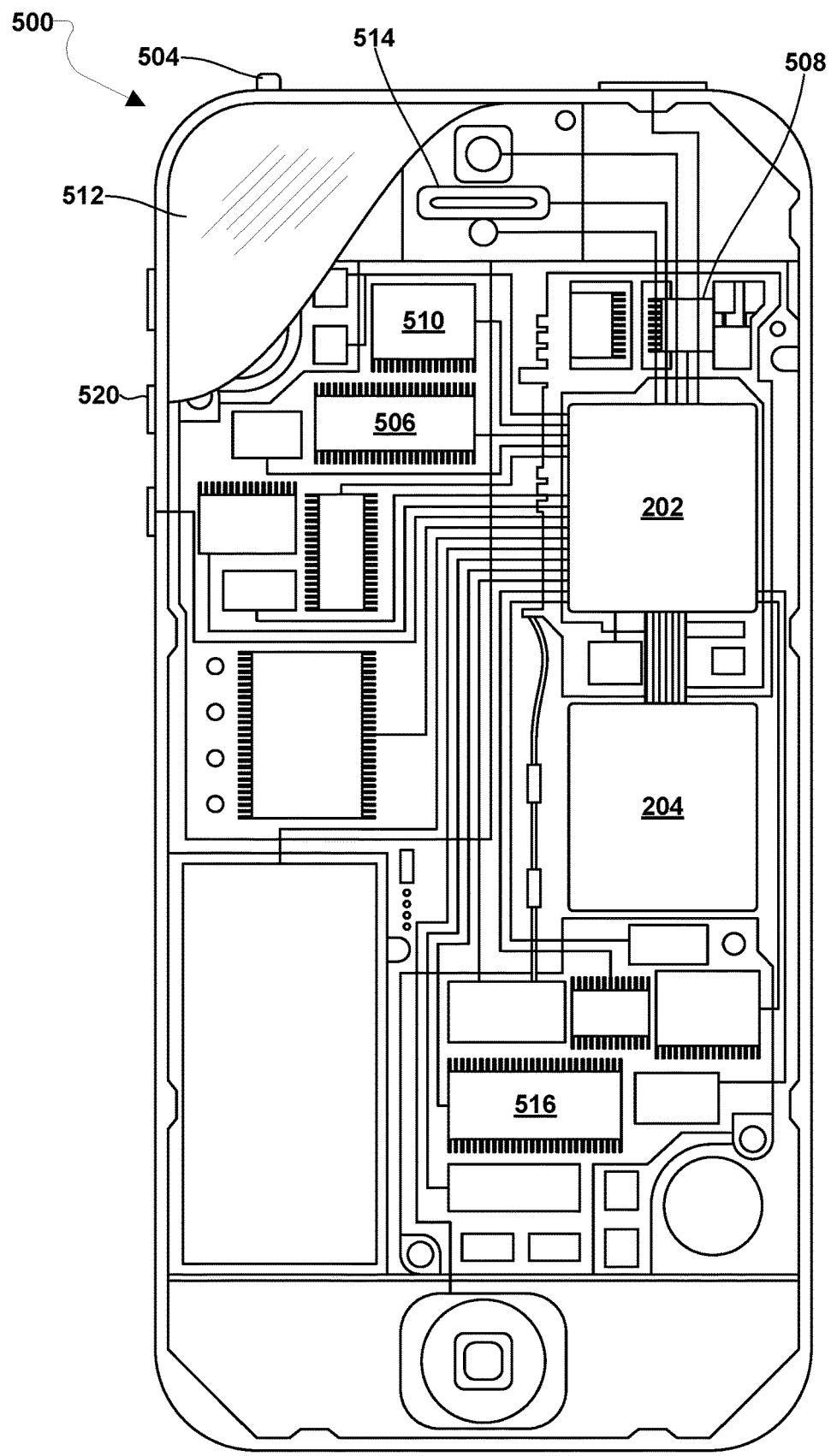
FIG. 5 is a component block diagram of an example client device suitable for implementing various embodiments.

The various embodiments may be implemented on a variety of client devices, an example of which is illustrated in FIG. 5 in the form of a smartphone. A smartphone 500 may include a first system on chip 202 (e.g., a SOC-CPU) coupled to a system on chip 204 (e.g., a 5G capable SOC). The first and second SOCs 202, 204 may include processors (e.g., application processor, modem processor, graphics processor, etc.), and may be coupled to internal memory 506, 516, a display 512, and to a speaker 514. Additionally, the client device 500 may include an antenna 504 for sending and receiving electromagnetic radiation that may be connected to a wireless data link and/or cellular telephone transceiver 508 coupled to one or more processors in the first and/or second SOCs 202, 204. Client devices 500 may also include menu selection buttons or rocker switches 520 for receiving user inputs.

A client device 500 may also include a sound encoding/decoding (CODEC) circuit 510, which digitizes sound received from a microphone into data packets suitable for wireless transmission and decodes received sound data packets to generate analog signals that are provided to the speaker to generate sound. Also, one or more of the processors in the first and second SOCs 202, 204, transceiver 508 and CODEC circuit 510 may include a digital signal processor (DSP) circuit (not shown separately).

The processors of a client device 500 may be any programmable microprocessor, microcomputer or multiple processor chip or chips that can be configured by software instructions (applications) to perform a variety of functions, including the functions of the various implementations described above. Typically, software applications may be stored in the memory 506, 516 before they are accessed and loaded into the processor. The processors may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 400, 410, 420, and 430 may be substituted for or combined with one or more operations of the methods 400, 410, 420, and 430.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method of dynamically adjusting a low-latency mode of a modem in a client device, including: monitoring downlink data packets of a client software application operating on the client device to detect a trigger event; determining operating parameters of the modem based on a detected trigger event; and dynamically adjusting the low-latency mode of the modem based on the determined operating parameters.

Example 2. The method of example 1, wherein: monitoring downlink data packets of the client software application operating on the client device to detect a trigger event further includes evaluating timestamps of previously received data packets to determine whether previously received data packets arrived early or late; and dynamically adjusting the low-latency mode of the modem based on the determined operating parameters includes toggling between different low latency modes with different latencies based on whether the previously received data packets arrived early or late.

Example 3. The method of example 1, wherein: monitoring downlink data packets of the client software application operating on the client device to detect a trigger event includes monitoring downlink data packets to determine whether a condition of the client software application is static or near-static; determining the operating parameters of the modem based on the detected trigger event further includes setting a timer in response to determining that the condition of the client software application is static or near-static; and dynamically adjusting the low-latency mode of the modem based on the determined operating parameters includes: determining whether the timer has expired; aggregating or accumulating downlink data packets in the modem in response to determining that the timer has not expired; and invoking a packet flush that sends downlink data packets to a next level in a protocol or processing stack of the modem without performing accumulation or aggregation operations in response to determining that the timer has expired.

Example 4. The method of example 1, wherein monitoring downlink data packets of the client software application operating on the client device to detect a trigger event includes monitoring downlink data packets to: detect a transport layer time out trigger event; detect whether all fragments corresponding to a slice arrived within a data burst; detect whether downlink data packets arrive earlier than expected; detect whether downlink data packets arrive later than expected; detect a download service outage event; or detect a controller event.

Example 5. The method of any of examples 1-4, wherein determining the operating parameters of the modem based on the detected trigger event includes determining the operating parameters so as to balance tradeoffs between meeting immediate latency needs of the client software application and reducing power consumption on the client device.

Example 6. The method of any of examples 1-4, wherein determining the operating parameters of the modem based on the detected trigger event includes at least one of: determining based on the detected trigger event whether to operate the client device at a higher power consumption level to increase the rate of delivering downlink data packets to the client software application; determining based on the detected trigger event whether to process downlink data packets in a hardware block of the modem without active involvement of a main application processor (AP) of the client device to reduce power consumption on the client device; or determining based on the detected trigger event whether to aggregate downlink data packets in the modem to reduce power consumption on the client device.

Example 7. The method of any of examples 1-6, wherein dynamically adjusting the low-latency mode of the modem based on the determined operating parameters includes: invoking a packet flush at a fast time scale so that downlink data packets identified by the client software application are moved to a next level in a protocol or processing stack of the modem without performing accumulation or aggregation operations to reduce latency on the client device; and performing the accumulation or aggregation operations on the remaining downlink data packets to reduce power consumption on the client device.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The functions described for various embodiments may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of dynamically adjusting a low-latency mode of a modem in a client device, comprising:
monitoring, by the modem, downlink data packets of a client software application operating on the client device to detect a trigger event;
determining, in the modem, IP Accelerator (IPA) parameters of the modem based on a detected trigger event; and
dynamically adjusting, by the modem, the low-latency mode of the modem in which received data is passed from the modem to the client software application without aggregation or accumulation based on the determined IPA parameters.

2. The method of claim 1, wherein determining the IPA parameters of the modem based on the detected trigger event comprises at least one of:
determining based on the detected trigger event whether to operate the client device at a higher power consumption level to increase the rate of delivering downlink data packets to the client software application;
determining based on the detected trigger event whether to process downlink data packets in a hardware block of the modem without active involvement of a main application processor (AP) of the client device to reduce power consumption on the client device; or
determining based on the detected trigger event whether to aggregate downlink data packets in the modem to reduce power consumption on the client device.

3. The method of claim 1, wherein dynamically adjusting the low-latency mode of the modem in which received data is passed from the modem to the client software application without aggregation or accumulation based on the determined IPA parameters comprises:
invoking a packet flush at a fast time scale so that downlink data packets identified by the client software application are moved to a next level in a protocol or processing stack of the modem without performing accumulation or aggregation operations to reduce latency on the client device; and
performing the accumulation or aggregation operations on the remaining downlink data packets to reduce power consumption on the client device.

4. The method of claim 1, wherein:
monitoring downlink data packets of the client software application operating on the client device to detect a trigger event further comprises evaluating timestamps of previously received data packets to determine whether previously received data packets arrived early or late; and
dynamically adjusting the low-latency mode of the modem in which received data is passed from the modem to the client software application without aggregation or accumulation based on the determined IPA parameters comprises toggling between different low latency modes with different latencies based on whether the previously received data packets arrived early or late.

5. The method of claim 1, wherein:
monitoring downlink data packets of the client software application operating on the client device to detect a trigger event comprises monitoring downlink data packets to determine whether a condition of the client software application is static;
determining the IPA parameters of the modem based on the detected trigger event further comprises setting a timer in response to determining that the condition of the client software application is static; and
dynamically adjusting the low-latency mode of the modem in which received data is passed from the modem to the client software application without aggregation or accumulation based on the determined IPA parameters comprises:
determining whether the timer has expired;
aggregating or accumulating downlink data packets in the modem in response to determining that the timer has not expired; and
invoking a packet flush that sends downlink data packets to a next level in a protocol or processing stack of the modem without performing accumulation or aggregation operations in response to determining that the timer has expired.

6. The method of claim 1, wherein monitoring downlink data packets of the client software application operating on the client device to detect a trigger event comprises monitoring downlink data packets to:
detect a transport layer time out trigger event;
detect whether all fragments corresponding to a slice arrived within a data burst;
detect whether downlink data packets arrive earlier than expected;
detect whether downlink data packets arrive later than expected;
detect a download service outage event; or
detect a controller event.

7. The method of claim 1, wherein determining the IPA parameters of the modem based on the detected trigger event comprises determining the IPA parameters based on tradeoffs between meeting immediate latency needs of the client software application and reducing power consumption on the client device.

8. A client device, comprising:
a modem processor configured to:
monitor downlink data packets of a client software application operating on the client device to detect a trigger event;
determine IP Accelerator (IPA) parameters of a modem of the client device based on a detected trigger event; and
dynamically adjust a low-latency mode of the modem in which received data is passed from the modem to the client software application without aggregation or accumulation based on the determined IPA parameters.

9. The client device of claim 8, wherein the modem processor is further configured to determine the IPA parameters of the modem based on the detected trigger event by:
determining based on the detected trigger event whether to operate the client device at a higher power consumption level to increase the rate of delivering downlink data packets to the client software application;
determining based on the detected trigger event whether to process downlink data packets in a hardware block of the modem without active involvement of a main application processor (AP) of the client device to reduce power consumption on the client device; or
determining based on the detected trigger event whether to aggregate downlink data packets in the modem to reduce power consumption on the client device.

10. The client device of claim 8, wherein the modem processor is further configured to dynamically adjust the low-latency mode of the modem in which received data is passed from the modem to the client software application without aggregation or accumulation based on the determined IPA parameters by:
  invoking a packet flush at a fast time scale so that downlink data packets identified by the client software application are moved to a next level in a protocol or processing stack of the modem without performing accumulation or aggregation operations to reduce latency on the client device; and
  performing the accumulation or aggregation operations on the remaining downlink data packets to reduce power consumption on the client device.

11. The client device of claim 8, wherein the modem processor is further configured to:
  monitor downlink data packets of the client software application operating on the client device to detect a trigger event by evaluating timestamps of previously received data packets to determine whether previously received data packets arrived early or late; and
  dynamically adjust the low-latency mode of the modem in which received data is passed from the modem to the client software application without aggregation or accumulation based on the determined IPA parameters by toggling between different low latency modes with different latencies based on whether the previously received data packets arrived early or late.

12. The client device of claim 8, wherein the modem processor is further configured to:
  monitor downlink data packets of the client software application operating on the client device to detect a trigger event by monitoring downlink data packets to determine whether a condition of the client software application is static;
  determining the IPA parameters of the modem based on the detected trigger event further comprises setting a timer in response to determining that the condition of the client software application is static; and
  dynamically adjust the low-latency mode of the modem in which received data is passed from the modem to the client software application without aggregation or accumulation based on the determined IPA parameters by:
    determining whether the timer has expired;
    aggregating or accumulating downlink data packets in the modem in response to determining that the timer has not expired; and
    invoking a packet flush that sends downlink data packets to a next level in a protocol or processing stack of the modem without performing accumulation or aggregation operations in response to determining that the timer has expired.

13. The client device of claim 8, wherein the modem processor is further configured to monitor downlink data packets of the client software application operating on the client device to detect a trigger event by monitoring downlink data packets to:
  detect a transport layer time out trigger event;
  detect whether all fragments corresponding to a slice arrived within a data burst;
  detect whether downlink data packets arrive earlier than expected;
  detect whether downlink data packets arrive later than expected;
  detect a download service outage event; or
  detect a controller event.

14. The client device of claim 8, wherein the modem processor is further configured to determine the IPA parameters of the modem based on the detected trigger event by determining the IPA parameters based on tradeoffs between meeting immediate latency needs of the client software application and reducing power consumption on the client device.

15. A non-transitory computer readable storage medium having stored thereon processor-executable software instructions configured to cause a modem of a client device to perform operations comprising:
  monitoring downlink data packets of a client software application operating on the client device to detect a trigger event;
  determining IP Accelerator (IPA) parameters of the modem based on a detected trigger event; and
  dynamically adjusting a low-latency mode of the modem in which received data is passed from the modem to the client software application without aggregation or accumulation based on the determined IPA parameters.

16. The non-transitory computer readable storage medium of claim 15, wherein the stored processor-executable software instructions are configured to cause the modem to perform operations such that determining the IPA parameters of the modem based on the detected trigger event comprises at least one of:
  determining based on the detected trigger event whether to operate the client device at a higher power consumption level to increase the rate of delivering downlink data packets to the client software application;
  determining based on the detected trigger event whether to process downlink data packets in a hardware block of the modem without active involvement of a main application processor (AP) of the client device to reduce power consumption on the client device; or
  determining based on the detected trigger event whether to aggregate downlink data packets in the modem to reduce power consumption on the client device.

17. The non-transitory computer readable storage medium of claim 15, wherein the stored processor-executable software instructions are configured to cause the modem to perform operations such that dynamically adjusting the low-latency mode of the modem in which received data is passed from the modem to the client software application without aggregation or accumulation based on the determined IPA parameters comprises:
  invoking a packet flush at a fast time scale so that downlink data packets identified by the client software application are moved to a next level in a protocol or processing stack of the modem without performing accumulation or aggregation operations to reduce latency on the client device; and
  performing the accumulation or aggregation operations on the remaining downlink data packets to reduce power consumption on the client device.

18. The non-transitory computer readable storage medium of claim 15, wherein the stored processor-executable software instructions are configured to cause the modem to perform operations such that:
  monitoring downlink data packets of the client software application operating on the client device to detect a trigger event further comprises evaluating timestamps of previously received data packets to determine whether previously received data packets arrived early or late; and
  dynamically adjusting the low-latency mode of the modem in which received data is passed from the modem to the client software application without aggregation or accumulation based on the determined IPA parameters comprises toggling between different low latency modes with different latencies based on whether the previously received data packets arrived early or late.

19. The non-transitory computer readable storage medium of claim 15, wherein the stored processor-executable software instructions are configured to cause the modem to perform operations such that:
monitoring downlink data packets of the client software application operating on the client device to detect a trigger event comprises monitoring downlink data packets to determine whether a condition of the client software application is static;
determining the IPA parameters of the modem based on the detected trigger event further comprises setting a timer in response to determining that the condition of the client software application is static; and
dynamically adjusting the low-latency mode of the modem in which received data is passed from the modem to the client software application without aggregation or accumulation based on the determined IPA parameters comprises:
determining whether the timer has expired;
aggregating or accumulating downlink data packets in the modem in response to determining that the timer has not expired; and
invoking a packet flush that sends downlink data packets to a next level in a protocol or processing stack of the modem without performing accumulation or aggregation operations in response to determining that the timer has expired.

20. The non-transitory computer readable storage medium of claim 15, wherein the stored processor-executable software instructions are configured to cause the modem to perform operations such that monitoring downlink data packets of the client software application operating on the client device to detect a trigger event comprises monitoring downlink data packets to:
detect a transport layer time out trigger event;
detect whether all fragments corresponding to a slice arrived within a data burst;
detect whether downlink data packets arrive earlier than expected;
detect whether downlink data packets arrive later than expected;
detect a download service outage event; or
detect a controller event.

21. The non-transitory computer readable storage medium of claim 15, wherein the stored processor-executable software instructions are configured to cause the modem to perform operations such that determining the IPA parameters of the modem based on the detected trigger event comprises determining the IPA parameters based on tradeoffs between meeting immediate latency needs of the client software application and reducing power consumption on the client device.

22. A client device, comprising:
means for monitoring, by a modem in the client device, downlink data packets of a client software application operating on the client device to detect a trigger event;
means for determining, by the modem, IP Accelerator (IPA) parameters of a modem of the client device based on a detected trigger event; and
means for dynamically adjusting, by the modem, a low-latency mode of the modem in which received data is passed from the modem to the client software application without aggregation or accumulation based on the determined IPA parameters.

23. The client device of claim 22, wherein means for determining the IPA parameters of the modem based on the detected trigger event comprises at least one of:
means for determining based on the detected trigger event whether to operate the client device at a higher power consumption level to increase the rate of delivering downlink data packets to the client software application;
means for determining based on the detected trigger event whether to process downlink data packets in a hardware block of the modem without active involvement of a main application processor (AP) of the client device to reduce power consumption on the client device; or
means for determining based on the detected trigger event whether to aggregate downlink data packets in the modem to reduce power consumption on the client device.

24. The client device of claim 22, wherein means for dynamically adjusting the low-latency mode of the modem in which received data is passed from the modem to the client software application without aggregation or accumulation based on the determined IPA parameters comprises:
means for invoking a packet flush at a fast time scale so that downlink data packets identified by the client software application are moved to a next level in a protocol or processing stack of the modem without performing accumulation or aggregation operations to reduce latency on the client device; and
means for performing the accumulation or aggregation operations on the remaining downlink data packets to reduce power consumption on the client device.

25. The client device of claim 22, wherein:
means for monitoring downlink data packets of the client software application operating on the client device to detect a trigger event further comprises means for evaluating timestamps of previously received data packets to determine whether previously received data packets arrived early or late; and
means for dynamically adjusting the low-latency mode of the modem in which received data is passed from the modem to the client software application without aggregation or accumulation based on the determined IPA parameters comprises means for toggling between different low latency modes with different latencies based on whether the previously received data packets arrived early or late.

26. The client device of claim 22, wherein:
means for monitoring downlink data packets of the client software application operating on the client device to detect a trigger event comprises means for monitoring downlink data packets to determine whether a condition of the client software application is static;
means for determining IPA parameters of the modem based on the detected trigger event further comprises means for setting a timer in response to determining that the condition of the client software application is static; and
means for dynamically adjusting the low-latency mode of the modem in which received data is passed from the modem to the client software application without aggregation or accumulation based on the determined IPA parameters comprises:
means for determining whether the timer has expired;

means for aggregating or accumulating downlink data packets in the modem in response to determining that the timer has not expired; and means for invoking a packet flush that sends downlink data packets to a next level in a protocol or processing stack of the modem without performing accumulation or aggregation operations in response to determining that the timer has expired.

27. The client device of claim 22, wherein means for monitoring downlink data packets of the client software application operating on the client device to detect a trigger event comprises means for monitoring downlink data packets to:

detect a transport layer time out trigger event;
detect whether all fragments corresponding to a slice arrived within a data burst;
detect whether downlink data packets arrive earlier than expected;
detect whether downlink data packets arrive later than expected;
detect a download service outage event; or
detect a controller event.

28. The client device of claim 22, whether means for determining the IPA parameters of the modem based on the detected trigger event comprises means for determining the IPA parameters based on tradeoffs between meeting immediate latency needs of the client software application and reducing power consumption on the client device.

* * * * *